Patented June 12, 1934

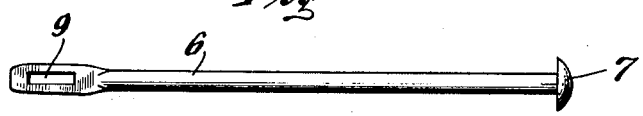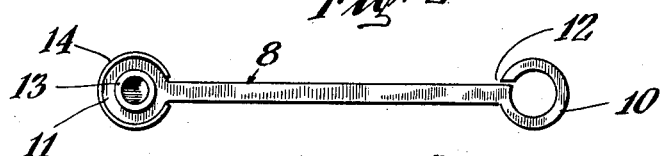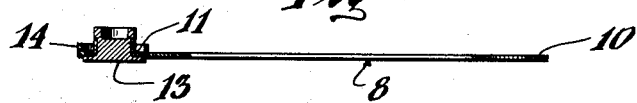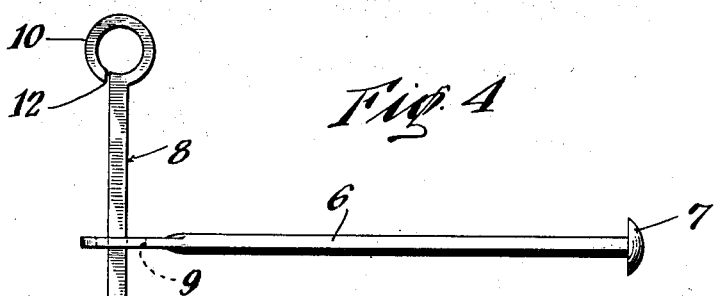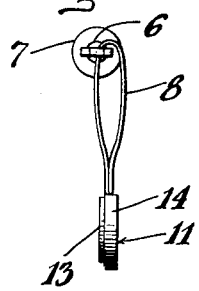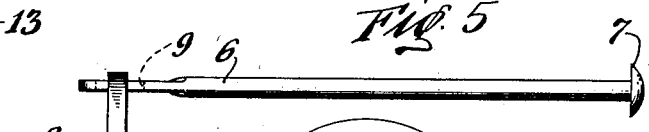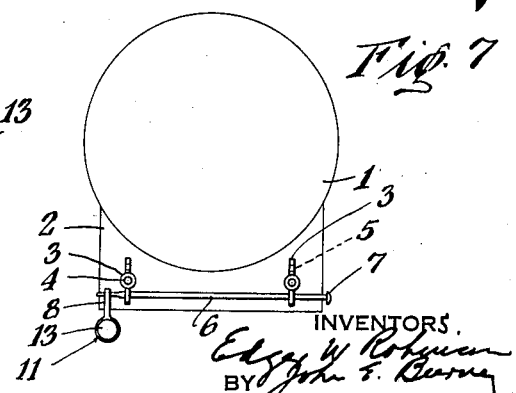

1,962,841

UNITED STATES PATENT OFFICE 1,962,841

SEALING MEANS

Edgar W. Robinson and John E. Burney, Birmingham, Ala., assignors to E. J. Brooks Company, Newark, N. J., a corporation of New Jersey Application May 10, 1932, Serial No. 610,489

1 Claim. (Cl. 292—313)

This invention relates to sealing means, and has for its main object and feature the production of a shackle-seal, of simple and inexpensive construction, capable of being readily applied and used as a meter seal.

In the accompanying drawing the invention is disclosed in a concrete and preferred form in which:

Fig. 1 is a view in elevation of a bar constituting one of the members of the sealing means;

Fig. 2 is a view in elevation of a sheet-material shackle-member constituting another member of the sealing means;

Fig. 3 is an edge view, partly in section, of Fig. 2;

Fig. 4 is a view showing the shackle-member threaded into the aperture of the bar;

Fig. 5 is a view showing the shackle-member bent back upon itself and the sealing element expanded;

Fig. 6 is an end view of Fig. 5; and

Fig. 7 is a diagrammatic view of a meter showing the seal applied thereto.

Referring first to Fig. 7, as there shown 1 indicates a meter which has a cover 2 which is held in position by wing nuts 3 engaging threaded bolts 4. The wing nuts have openings 5, and in order to seal the device a bar 6 is passed through the openings in the wing nuts, said bar having a head 7 at one end and a shackle-member 8 which is applied to its other end after the bar has been passed through the openings in the wing nuts. By these means, rotation of the wing nuts is prevented, and access to the interior of the meter is not possible without destroying the seal.

Bar 6, which may be considered the element to be sealed, is provided, in addition to head 7 near one end, with an aperture 9 near its other end. Shackle-member 8 is of sheet material and is of a width somewhat narrower than aperture 9. At one end the shackle-member is provided with an enlargement here in the form of a loop-head 10 of larger size than aperture 9, and at its other end said shackle-member is provided with a cup-shaped head 11 also of larger size than aperture 9. Loop-head or annular enlargement 10 is severed or provided with a slot 12 so as to afford a free end for the purpose of threading the shackle-member through aperture 9, after the fashion of a key and a key-ring. Carried by the cup-shaped head is a sealing element 13 of compressible material of such size that it will extend through loop member 10 when the shackle-member is bent back upon itself, after being threaded through aperture 9, and the loop-head enters within the cup-shaped head. If said sealing element is now expanded it will cover loop-head 10. It is to be noted that cup-shaped head 11 is formed by providing an upstanding flange 14, and this flange serves to prevent loop-head 10 from opening at 12 when expanding the lead or sealing element 13. Said flange also serves to confine the lead so that it will properly cover loop-head 10.

We claim:

As a new article of manufacture a shackle-member comprising a strip of sheet material having at one end an annular enlargement provided with a slot that permits the annular enlargement and shackle-member to be threaded through an aperture of an element to be sealed, and having at its other end a cup-shaped head for the reception of the enlargement when the shackle-member is bent back upon itself after being threaded through the aperture aforesaid, and means to seal the enlargement within the confines of the cup-shaped head.

EDGAR W. ROBINSON.
JOHN E. BURNEY.